(12) United States Patent
Müller

(10) Patent No.: US 6,629,584 B1
(45) Date of Patent: Oct. 7, 2003

(54) CLAMPING AND/OR BRAKING DEVICE

(75) Inventor: Willy Müller, Moosach (DE)

(73) Assignee: InnoTech Engineering GmbH, Pienzenau (DE)

( * ) Notice: Subject to any disclaimer, the term of this patent is extended or adjusted under 35 U.S.C. 154(b) by 0 days.

(21) Appl. No.: 10/129,805
(22) PCT Filed: Nov. 2, 2000
(86) PCT No.: PCT/DE00/03850
§ 371 (c)(1),
(2), (4) Date: May 9, 2002
(87) PCT Pub. No.: WO01/34990
PCT Pub. Date: May 17, 2001

(30) Foreign Application Priority Data

Nov. 11, 1999 (DE) .......................... 199 54 439

(51) Int. Cl.$^7$ ................................. B61H 7/12
(52) U.S. Cl. .......................... 188/43; 403/31
(58) Field of Search ............................ 403/31, 373, 5, 403/34, 24; 279/4.03, 2.08; 188/43

(56) References Cited

U.S. PATENT DOCUMENTS

| 3,507,507 A | * 4/1970 | Tobler et al. ............... 279/4.03 |
| 3,626,506 A | * 12/1971 | Spieth .......................... 403/31 |
| 3,663,027 A | 5/1972 | Klipping |
| 4,027,867 A | 6/1977 | Pollinigton |
| 4,264,229 A | * 4/1981 | Falk et al. ...................... 403/5 |
| 4,813,657 A | 3/1989 | Todd |
| 5,855,446 A | 1/1999 | Disborg |
| 6,182,977 B1 | * 2/2001 | Weller ....................... 279/2.08 |

FOREIGN PATENT DOCUMENTS

| DE | 35 43 455 A | 6/1987 |
| EP | 0 312 451 A | 4/1989 |
| EP | 0 834 380 A | 4/1998 |
| EP | 0 936 366 A | 8/1999 |

OTHER PUBLICATIONS

"Empfindliche Werkstucke Sicher Gespannt Clamping Sensitive Components Safely," F & M. Feinwerktechnik Mikrotechnik.
Messtechnik, De, Carl Hanser GmbH, Munchen, Vo. 103, No. 5, pp. S33–S36, XP00533509, ISSN: 0944–1018, May 1, 1995.

* cited by examiner

Primary Examiner—Christopher P. Schwartz
Assistant Examiner—Melanie Torres
(74) Attorney, Agent, or Firm—Shaffer & Culbertson, L.L.P.

(57) ABSTRACT

A clamping and/or braking device with a basic body (3) has a clamping and/or braking region for pressurizing an element (9). Basic body (3) has an actuating mechanism which, upon actuation, causes a substantially elastic deformation of the basic body (3), so that the clamping and/or braking region is moved into or out of a pressurizing position or that the pressurizing force which the clamping and/or braking region exerts on the element (9) is changed. The actuating mechanism comprises a minimum of one chamber (15), which can be pressurized and which is located on or incorporated in the basic body (3) and which is bounded at least in part by a minimum of one wall (13), at least partial regions of which are flexible but tension-proof and/or pressure-resistant. The wall (13) is connected to the basic body (3) so as to ensure that upon pressurization of the minimum of one chamber (15) forces are exerted on the basic body (3), which forces generate an essentially elastic deformation of said basic body or a change in the pressurizing force that is exerted by the clamping and/or braking region.

16 Claims, 4 Drawing Sheets

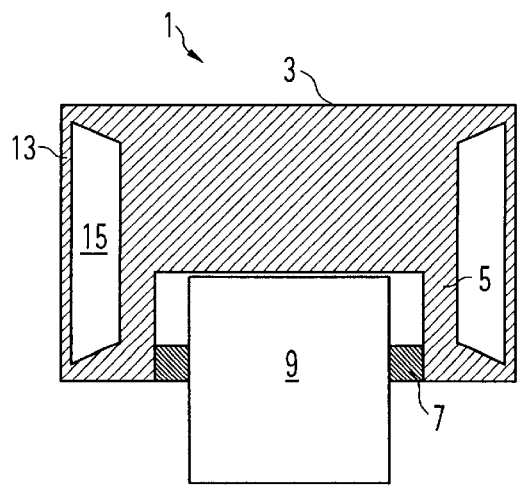
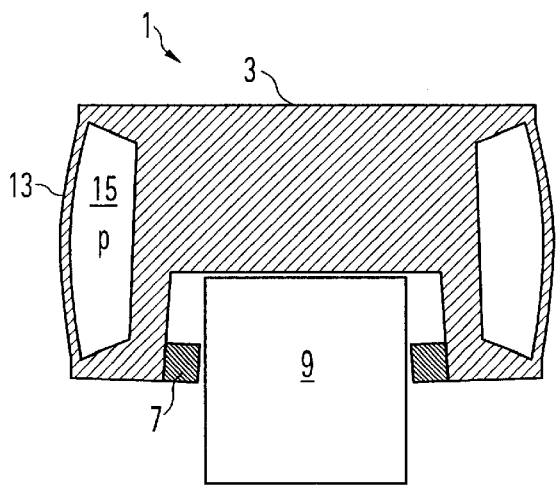
FIG. 3a    FIG. 3b
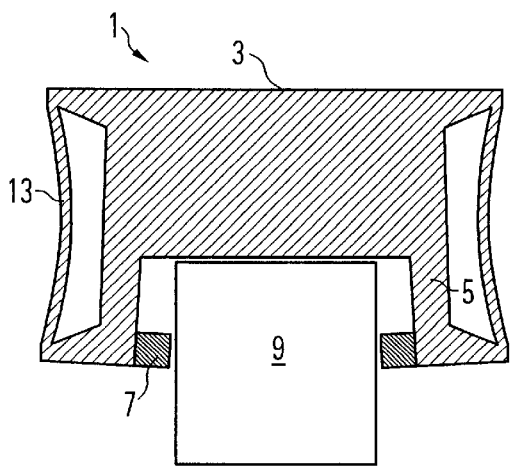
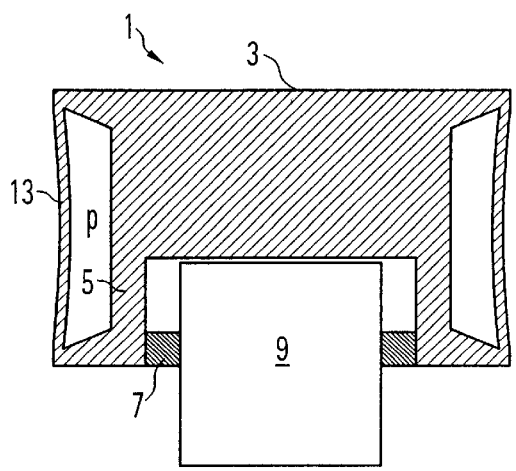
FIG. 4a    FIG. 4b

CLAMPING AND/OR BRAKING DEVICE

TECHNICAL FIELD OF THE INVENTION

The subject matter of the present invention relates to a clamping and/or braking device

BACKGROUND OF THE INVENTION

Clamping and/or braking devices in a variety of different embodiments and for the most varied applications are known. Thus, for example, EP-A-0 936 366 describes a braking device for a linear guide system which has a supporting body that can move along a guide rail. The supporting body has brake shoes which act on both longitudinal sides. The supporting body is designed in the form of an H and has a narrow, flexible bridge and two lower legs by means of which said supporting body embraces the guide rails. The brake shoe is located between each lower leg and the guide rail. The supporting body has two upper legs which, together with the bridge, form a holding space in which a force-generating means that acts on the upper legs is provided. This force-generating means may be a toggle mechanism which can be hydraulically or pneumatically actuated or a piezo-actuator. In addition, a wedge valve serving as a force transducer can be provided, which can be hydraulically or pneumatically actuated and is located in a space specifically provided for this purpose, which space is located between the upper legs of the supporting body and tapers off in the longitudinal direction of the braking device. In all cases, the elastic bridge is bent as a result of the force with pressure is exerted on the two upper legs, thus causing the two lower legs with the brake shoes to move inward and to pressurize the guide rail with greater force.

The disadvantage of this known braking device in combination with the use of an electromechanical transducer, for example, a piezo-element, is, in particular, the sensitivity of said transducer to shock or other mechanical strains.

The assembly and production costs required when a toggle mechanism or a wedge valve as well as an electromechanical transducer are used are high.

In addition, especially in the case of clamping devices, sufficiently high clamping forces are necessary, but given the devices known at this time, to achieve these forces, the structural volume required and thus the financial expenditure are relatively high.

U.S. Pat. No. 5,855,446 describes a hydraulic clamping bushing which is aligned on a shaft to which it can be connected, for example, without rotational play. The bushing has an essentially stable bushing body which is located at a distance from and around a driving shaft. Abutting this bushing body and facing the shaft is a chamber which can be pressurized. A side wall of this chamber, which runs essentially parallel to the shaft, at the same time serves as a braking element which—when the chamber is pressurized, as a result of which the wall is expanded—is pressed against the shaft, thus producing a frictional lockup connection. The Σ-shaped design of the laterally abutting walls of the chamber is intended to prevent a misalignment of the bushing with regard to the shaft when the chamber is pressurized. Upon pressurization, the Σ-shaped lateral walls of the chamber can expand in the radial direction toward the shaft even before the pressure in the chamber, which is gradually increasing, also presses the wall of the chamber which runs parallel to the shaft against said shaft. This makes it possible for the bushing to be aligned at a right angle with respect to the axis of the shaft before the rotationally tight connection is produced.

In this clamping device, the transmission of forces for the production of high contact pressures is not satisfactory. In addition, the shape that the chamber can have and, in particular, its potential positioning relative to the bushing body are limited. A braking action can be obtained only by means of a pressurization with overpressure, and the actual braking element, which must potentially be able to transmit high driving forces, is not tightly connected to the bushing body but instead only by way of the pressure chamber which is relatively unstable in nature.

Based on this prior art, the problem to be solved by the present invention is to make available a clamping and/or braking device which can be manufactured so as to require a low structural volume and by means of which it is possible to achieve high braking and/or clamping forces. In addition, it should be possible to use the clamping and/or braking device according to the present invention in a variety of applications and, in particular, under conditions of extreme shock and/or vibrations.

SUMMARY OF THE INVENTION

The present invention is based on the recognition that upon pressurization of a suitable chamber by means of a vacuum or by means of overpressure, said chamber should undergo a certain deformation. When such a chamber is largely formed by a wall which is at least approximately straight, the overpressure or the vacuum in the chamber will first cause a deformation which is directed in a first direction which runs essentially perpendicular to this wall. To yield to the deformation (expansion or contraction) which is directed in this first direction, in turn, a corresponding contraction or expansion of the chamber in a second direction results, which second direction generally runs perpendicular to the first direction (i.e., essentially parallel to the wall).

This takes advantage of the fact that low forces or deformations directed in the first direction are able to generate high forces which are directed in the second direction. According to the present invention, these forces are transmitted and utilized for braking or clamping or for releasing prestressed clamping and/or braking devices.

Thus, the chamber is bounded at least in a partial region by a minimum of one flexible but tension-proof and/or pressure-resistant wall The boundary of the chamber that lies opposite to the wall can have the same design as the first wall. But it can also be a rigid portion of a body. Preferably, the walls are located at a relatively short distance from each other. The forces resulting from the deformation of the chamber are transmitted at least in part in the direction of or along the wall and, in the region of the connection of the wall with a basic body, these forces are introduced into said basic body. If the point of application of said forces on the basic body is properly chosen and if this basic body is at least in part elastically deformable, these forces can be transmitted via this basic body to other parts of the basic body, for example, into clamping and/or braking regions. By means of these forces, a suitable braking or clamping means in these regions can subsequently be moved into or out of a pressurizing position so as to brake or release a guide element or an element that is to be clamped or braked. According to the present invention, both the applied overpressure and the applied vacuum in the chamber can be used to introduce both tensile and compressive forces into the basic body. It is, of course, also possible for the clamping and/or braking regions, prior to and after the introduction of the forces, to still be engaged with the guide element or with the element that is to be clamped or braked, in which case, however, changes in the pressurizing forces between the clamping and/or braking regions and the other element result.

In one particular embodiment of the present invention, at least partial regions of the wall in which tensile or compressive forces are to be exerted on the basic body are connected to the basic body by means of an articulated joint region which is narrower than the thickness of the wall. This leads to the advantage of a higher efficiency during the conversion of the pressure exerted on the wall into tensile forces or tensile stresses that are transmitted to the basic body.

In another embodiment of the present invention, the chamber can be formed by two walls which are preferably located at a short distance from each other and which are connected to the basic body along their edges, by means of which the forces are to be transmitted to said basic body. As a result, compared to the use of one single flexible tension-proof wall, the forces are essentially twice as high.

According to yet another embodiment of the present invention, the minimum of one flexible wall, when in the state in which the chamber is not pressurized, is essentially straight so that in this state, no tensions worth mentioning—other than a potential initial stress on the wall—can build up through the wall in the basic body.

It is, of course, also possible to design the minimum of one flexible wall so that, when the chamber is not pressurized, this wall is concave or convex relative to the inside of the chamber. As with a straight wall, it is possible as early as in the unpressurized state for an initial stress to be present in the basic body and/or in the wall. Upon pressurization of the chamber by means of overpressure, a wall that is convex in the direction of the inside of the chamber can, by way of its edge regions, exert a compressive stress or force, in addition to a potentially existing initial compressive stress in the basic body and/or in the wall, on the corresponding regions of the basic body. Upon pressurization by means of a vacuum, on the other hand, said wall can reduce a potentially existing compressive stress or force or produce a tensile stress or force. A wall which, in the unpressurized state of the chamber, is convex in the direction of the outside of the chamber can serve to increase a tensile stress or force when the chamber is pressurized by means of overpressure, or it can generate a compressive stress or force in addition to a potentially already existing initial compressive stress when the chamber is pressurized by means of a vacuum.

According to another embodiment of the present invention, the minimum of one wall can contact a region of the basic body so that, relative to the minimum of one clamping and/or braking region, a mechanical transmission or reduction is generated via the basic body as well. As a result, it is possible, either by means of relatively low pressures of the pressure medium which serves to pressurize the minimum of one chamber, to produce high clamping and/or braking forces (in which case the path of motion of the clamping and/or braking regions is relatively short), or by means of relatively high pressures of the pressure medium (which pressures are possibly not reducible) to produce relatively low clamping and/or braking forces (in which case the path of motion of the clamping and/or braking regions is relatively long).

The basic body of the device according to the present invention can be designed so as to have an essentially U-shaped cross section. A clamping and/or braking region can be provided on the inner surface or on the outer surface of one or both legs of the U. At least on or in a wall of a leg of the U on which a clamping and/or braking region is located, a chamber with at least one flexible and pressure-resistant and/or tension-proof wall can be provided to generate compressive or tensile stresses in the basic body, which cause a movement or pressurization of the minimum of one clamping and/or braking region.

In yet another embodiment of the present invention, the basic body can be designed so as to have an essentially H-shaped cross section, and the minimum of one wall of the minimum of one chamber can be connected to the upper legs of the basic body. A minimum of one clamping and/or braking region can be present on the inner surfaces or on the outer surfaces of the lower legs of the basic body.

In another embodiment of the present invention, the basic body can have an outer region and an inner region which is designed in the form of a closed ring and which is connected to said outer region by way of a connecting region, with the minimum of one chamber being located in the connecting region in such a way that upon pressurization, a deformation of the closed ring results. As a result, a change in the forces that are exerted via the inner wall of the ring on a guide element or on an element to be clamped or braked is effected, in particular, a complete release of the ring from the element or a complete clamping of the element.

When this basic body is designed in the form of a ring as described above, at least one partial region of the connecting region can have two walls which extend essentially between the outer region and the inner region of the basic body and which form at least one space. It is also possible for the entire connecting region to be formed by walls which extend in a radial direction and which are preferably essentially parallel to one another.

BRIEF DESCRIPTION OF THE DRAWINGS

FIG. 3*a* is a diagrammatic cross section of a third embodiment of a clamping and/or braking device according to the present invention with a U-shaped basic body and a wall that is straight when the chamber is not pressurized.

FIG. 3*b* is a diagrammatic cross section similar to FIG. 3*a*, but showing the condition of the device when the chamber is pressurized.

FIG. 4*a* is a diagrammatic cross section of a fourth embodiment of a clamping and/or braking device according to the present invention with a U-shaped basic body.

FIG. 4*b* is a diagrammatic cross section similar to FIG. 4*a*, but showing the condition of the device when the chamber is pressurized.

DESCRIPTION OF PREFERRED EMBODIMENTS

Figure 1A:
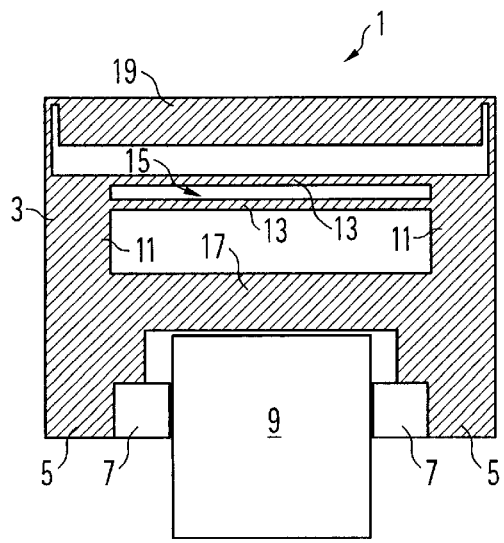
FIG. 1*a* is a diagrammatic cross section of a first embodiment of a clamping and/or braking device according to the present invention with an H-shaped basic body and a wall that is straight when the chamber is not pressurized.
Figure 1B:
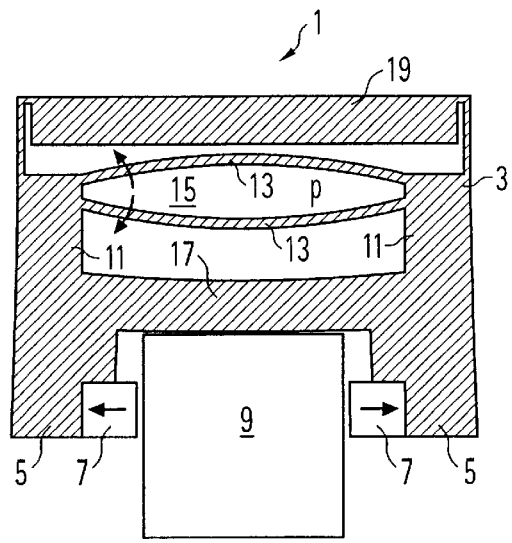
FIG. 1*b* is a diagrammatic cross section similar to FIG. 1*a*, but showing the condition of the device when the chamber is pressurized.

Clamping and/or braking device 1 shown in FIGS. 1a and 1b comprises basic body 3, the cross section of which is designed essentially in the form of an H. Brake shoes 7 are provided on the inside surfaces of the two lower legs 5 of basic body 3, the inwardly facing surfaces of said brake shoes pressurizing an element 9 which may be a guide element of a linear guide system or an element to be clamped or to be braked.

Between the two upper legs 11 of the H-shaped basic body 3, there are two narrow elastic but tension-proof walls 13 which run essentially parallel to each other and which are located at a relatively short distance to each other. Walls 13 are connected to an upper region of the upper legs 11 of the H-shaped basic body 3 along the longitudinal edges (perpendicular to the plane of the drawing). The transverse (in the plane of the drawing) edges of walls 13 are connected to each other so as to be pressure-proof or closed in another manner so as to be pressure-proof. Via a pressure connection (for example, along the transverse edges, on the wall, or by a channel provided in basic body 3), a pressure medium for generating an overpressure or a vacuum can be respectively applied to or withdrawn from chamber 15, which is formed between walls 13 and which can be pressurized.

The embodiment shown in FIGS. 1a and 1b is designed mainly to pressurize chamber 15 with overpressure.

The connection of the longitudinal edges of walls 13 to the upper legs 11 can be implemented by a connecting region with a narrower cross section, which connecting region functions similarly to a film hinge. This produces lower mechanical losses in the region of the connection since the forces required to bend these regions are lower.

In the unpressurized state illustrated in FIG. 1a, the two walls 13 are essentially parallel to each other or are slightly convex toward the outside, if, following pressurization and subsequent relaxation, the deformed walls were not to recover their original shape completely.

In this state, element 9 is clamped or braked between the clamping and/or brake shoes 7 by means of a force that is generated by means of initial stress in the basic body or in the walls. This force depends on the geometric dimensions of element 9 and of basic body 3 in a state without pressurization of the chamber and without element 9 being between shoes 7 and on the dimensions of basic body 3 and the material of which it is made.

When chamber 15 is pressurized with pressure p, the flexible walls 13 curve outwardly, as shown in FIG. 1b. Since the walls are tension-proof, the bending produces a tensile force which each wall 13 exerts via its longitudinal edges on the upper legs 11 of basic body 3.

The basic body is designed and dimensioned so as to ensure that these tensile forces cause lower legs 5 to move toward the outside. To dimension said basic body, the bridge region 17 of basic body 3 can be suitably designed so that it has a sufficiently high flexibility.

Walls 13 may, of course, extend over the entire length between the connecting points to basic body 3, but they may also be shorter. The decisive criterion is in particular the necessary tensile force that is to be exerted on the upper legs 11 since this tensile force is essentially dependent on the maximum attainable or admissible pressure in chamber 15 and the inner surfaces of walls 13 that are pressurized by means of this pressure.

Mounting region 19 which, in the upper region of legs 11, is connected to said legs, serve to attach device 1 to a unit not specifically shown in the drawing. This may be a movable element, e.g., a carriage of a machine tool or a similar element. To ensure that the above-described functioning of device 1 is not impaired, mounting region 19 is connected to a narrowly designed upper region of upper legs 11. This upper region is sufficiently flexible so as to ensure that the upper legs 11 have sufficient freedom of movement.

Figure 2A:
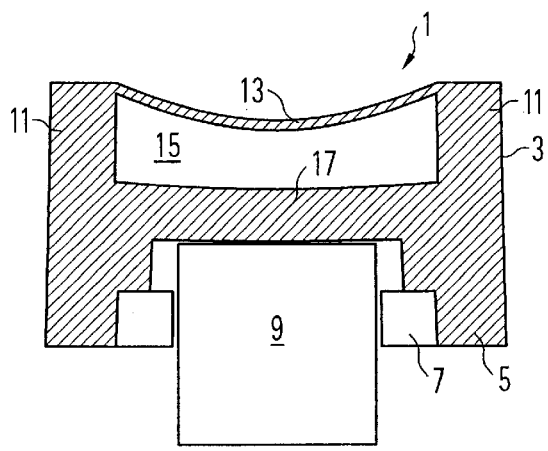
FIG. 2*a* is a diagrammatic cross section of a second embodiment of a clamping and/or braking device according to the present invention with an H-shaped basic body.
Figure 2B:
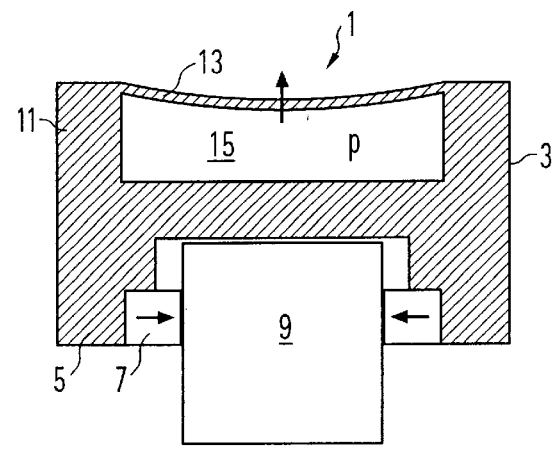
FIG. 2*b* is a diagrammatic cross section similar to FIG. 2*a*, but showing the condition of the device when the chamber is pressurized.

FIGS. 2a and 2b show a variant of clamping and/or braking-device 1 which is very similar to the embodiment shown in FIGS. 1a and 1b. In contrast to FIGS. 1a and 1b, however, this second embodiment has only one single wall 13 which, in the upper region of the upper legs 11, is connected to said legs.

In this embodiment, chamber 15 is formed by the entire space between wall 13 and basic body 3 between the upper legs 11 of said basic body. In contrast to the embodiment in FIGS. 1a and 1b, however, the forces that are exerted on legs 11 are only approximately half as high. As a result of the relatively large dimensions of bridge region 17, the bending of this bridge due to the pressurization can be almost neglected.

Unlike the embodiment in FIGS. 1a and 1b, however, the embodiment in FIGS. 2a and 2b is meant to exert an active clamping motion relative to element 9. For this purpose, wall 13, when in the unpressurized state (FIG. 2a), is designed so as to be convex relative to the inside of chamber 15. Optionally, the wall may have a defined initial stress, and be welded, for example, between the upper legs 11. When chamber 15 is pressurized by means of overpressure p, wall 13 is pushed toward the outside, and thus a compressive force is exerted on legs 11 (FIG. 2b). By analogy to the above explanations that accompany FIGS. 1a and 1b, this leads to a movement of shoes 7 toward the inside in the direction of element 9 and an increase in the forces which shoes 7 exert on element 9. Wall 13 must be dimensioned so as to ensure that upon application of a maximum admissible pressure, wall 13 does not bend so as to become convex toward the outside or buckle toward the outside.

FIGS. 3a and 3b shows yet another embodiment in which the basic body is essentially U-shaped. Along the sides of (lower) legs 5 of basic body 3, chamber 15 which can be pressurized is provided, which chamber is closed off toward the outside by means of one single wall 13. In the unpressurized state of chamber 15, this wall is straight. Upon pressurization of chamber 15, walls 13 curve outward and thus exert an additional force on the lower region of the lower legs 5 in a manner already described above. Since wall 13 abuts an outwardly directed lever extension on leg 5, leg 5 is bent toward the outside. As a result, shoes 7 swing outward, and element 9 is released and the braking force reduced. At rest, the device shown in FIG. 3a functions in a similar fashion to the device shown in FIG. 1a, i.e., shoes 7 apply an initial stress and a force generated by said initial stress on element 9.

FIGS. 4a and 4b show an embodiment similar to the one seen in FIGS. 3a and 3b, except that the function of walls 13 is similar to the function they have in FIGS. 2a and 2b. In the unpressurized state, walls 13 are convexly curved toward the inside so that upon pressurization, compressive forces are exerted on the lever extension of the lower legs 5. As a result, element 9 is actively clamped/braked (upon pressurization).

Figure 5:
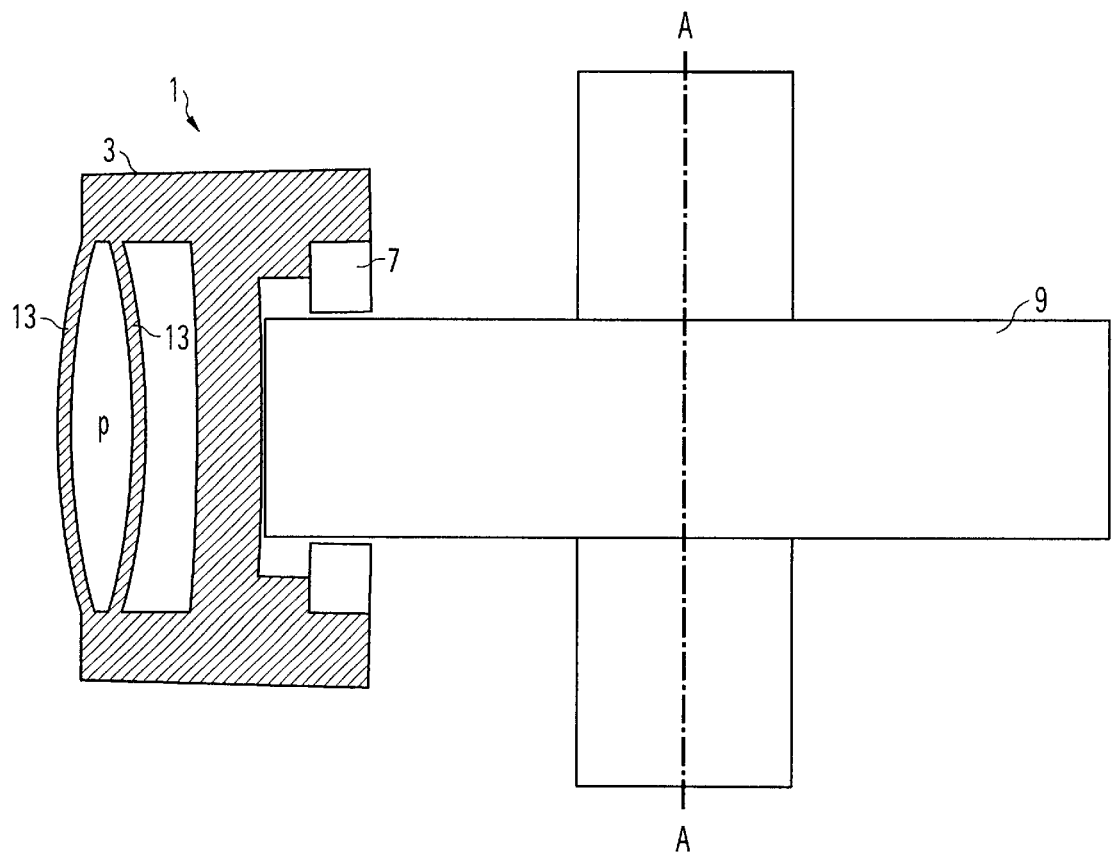
FIG. 5 is a diagrammatic cross section of a fifth embodiment of a clamping and/or braking device according to the present invention similar to the one seen in FIG. 1 for clamping/braking a rotation disklike element.

FIG. 5 shows an embodiment of a device similar to the one in FIG. 1, except that it does not have a mounting region, with device 1 in the pressurized state releasing an element 9 which is to be braked/clamped and which is located in the form of a disk that rotates about an axis A. This disk can be a brake pressure plate of a device, which is not specifically shown in the drawing, for example, of a drive of a machine tool or of a vehicle.

Figure 6A:
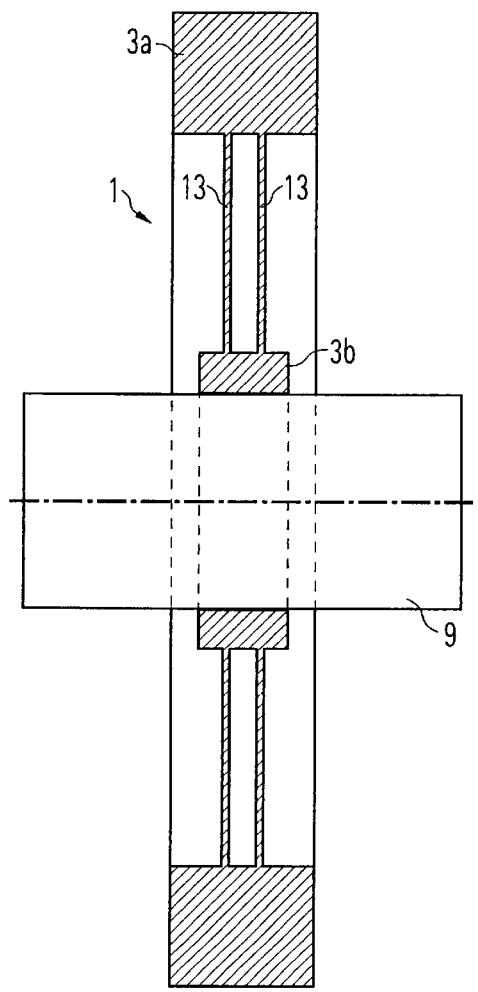
FIG. 6*a* is a diagrammatic cross section of a sixth embodiment of a clamping and/or braking device according to the present invention with an annular basic body and two walls that are straight when the chamber is not pressurized.
Figure 6B:
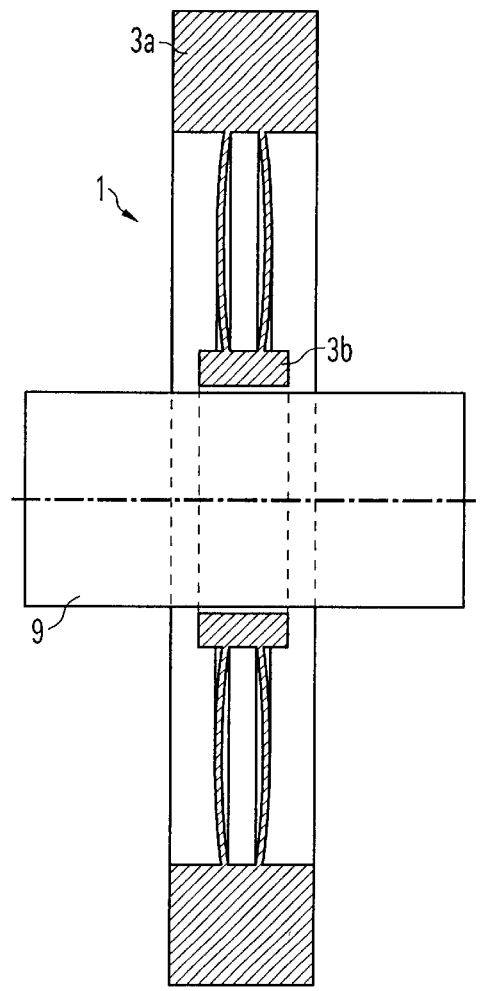
FIG. 6b is a diagrammatic cross section similar to FIG. 6a, but showing the condition of the device when the chamber is pressurized.

FIGS. 6a and 6b show yet another embodiment of clamping and/or braking device 1 in which the basic body has an outer ring 3a and an inner ring 3b. The two rings 3a,3b are connected via two walls 13 which are located at a close distance to each other. In the unpressurized state (FIG. 6a), these walls are straight and parallel to each other. In this state, element 9, which may be an axle, shaft, guide rod, or a similar element, is clamped or braked by inner ring 3b. Element 9 and the opening of inner ring 3b need not have a circular cross section, but may have any appropriately coordinated cross sections to achieve a clamping/braking action.

Upon pressurization of the chamber (FIG. 6b), walls 13 curve toward the outside and exert radial tensile forces on inner ring 3b, which expands as a result. This causes the braking action to be reduced and element 9 to be completely released.

Figure 7:
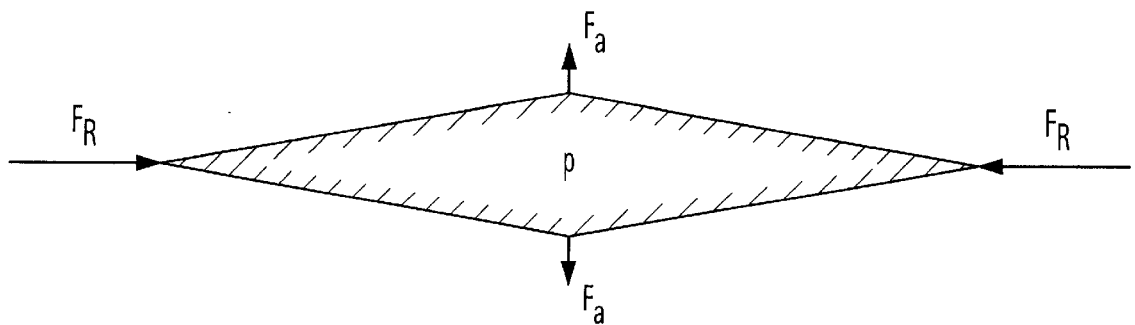
FIG. 7 is a simplified diagram to illustrate the forces in the chamber.

FIG. 7 shows a simplified representation of the force ratio between force $F_a$ and the resulting force $F_R$ for a chamber with two elastic walls. High tensile and compressive forces $F_R$ can be generated even by low overpressures or low vacuums p, and thus by low compressive and tensile forces $F_a$.

The walls need not necessarily fill the entire internal space between rings 3a, 3b. Instead, individual spoke-like chambers can be formed by one pair of walls 13 each. For example, the opening of the ring can have an oval cross section and can abut one chamber each on the less strongly curved side of the oval. As a result, element 9 is released upon pressurization, which, for example, has a circular cross section which has a diameter smaller than the small half-axis of the oval in the unpressurized state.

Similarly, by providing two spoke-like chambers, which lie opposite to each other, on the more strongly curved regions of the oval, an active clamping can be achieved when the chamber is pressurized.

In conclusion, it should be noted that the embodiments described represent only possibilities for implementing the fundamental idea of the present invention. All characteristics described in connection with a specific embodiment, if useful, can also be used in other embodiments.

What is claimed is:

1. A clamping and/or braking device including:
   (a) a basic body having an essentially U-shaped cross section with a clamping and/or braking region provided on the inner surface or on the outer surface of one or both legs of the U shape, each clamping and/or braking region for pressurizing an element which is to be clamped; and
   (b) an actuating mechanism connected to the basic body, the actuating mechanism including a chamber on or in a leg of the U shape on which a clamping and/or braking region is located with the chamber being at least partially bounded by an actuating wall which at least in partial regions is flexible but tension-proof and pressure-resistant, the actuating mechanism for exerting tensile or compressive forces on the basic body to substantially elastically deform the basic body in response to an overpressure or vacuum applied within the chamber, the deformation moving the clamping and/or braking region on the respective leg into or out of a pressurizing position or changing the pressurizing force which the clamping and/or braking region exerts on the element which is to be clamped.

2. The clamping and/or braking device of claim 1 wherein the actuating wall moves the clamping and/or braking region on the respective leg of the U shape out of the pressurizing position when the chamber is pressurized by means of overpressure or by means of a vacuum.

3. The clamping and/or braking device of claim 1 wherein in the state in which the chamber is not pressurized by means of overpressure or by means of a vacuum, the actuating wall is essentially straight.

4. The clamping and/or braking device of claim 1 wherein in the state in which the chamber is not pressurized by means of overpressure or by means of a vacuum, the actuating wall is convex or concave relative to the inside of the chamber.

5. The clamping and/or braking device of claim 1 wherein:
   (a) a first leg of the U shape includes a first chamber with the first chamber being at least partially bounded by a first actuating wall which at least in partial regions is flexible but tension-proof and pressure-resistant; and
   (b) a second leg of the U shape includes a second chamber with the second chamber being at least partially bounded by a second actuating wall which at least in partial regions is flexible but tension-proof and pressure-resistant.

6. The clamping and/or braking device of claim 1 wherein the actuating wall is connected to the basic body by an articulated joint region.

7. A clamping and/or braking device including:
   (a) a basic body having a substantially H-shaped cross section with a pair of upper legs and a pair of lower legs extending generally in a direction opposite to the upper legs, the basic body having a clamping and/or braking region provided on the inner surface or on the outer surface of one or both lower legs of the H shape, each clamping and/or braking region for pressurizing an element which is to be clamped; and
   (b) an actuating mechanism connected to the basic body, the actuating mechanism including a chamber with an actuating wall connected to the upper legs of the H shape, the actuating wall being at least in partial regions flexible but tension-proof and pressure-resistant, the actuating mechanism for exerting tensile or compressive forces on the basic body to substantially elastically deform the basic body in response to an overpressure or vacuum applied within the chamber, the deformation moving the clamping and/or braking region on the respective lower leg into or out of a pressurizing position or changing the pressurizing force which the clamping and/or braking region exerts on the element which is to be clamped.

8. The clamping and/or braking device of claim 7 wherein the actuating wall moves the clamping and/or braking region on the respective lower leg of the H shape out of the pressurizing position when the chamber is pressurized by means of overpressure or by means of a vacuum.

9. The clamping and/or braking device of claim 7 wherein in the state in which the chamber is not pressurized by means of overpressure or by means of a vacuum, the actuating wall is essentially straight.

10. The clamping and/or braking device of claim 7 wherein in the state in which the chamber is not pressurized by means of overpressure or by means of a vacuum, the actuating wall is convex or concave relative to the inside of the chamber.

11. The clamping and/or braking device of claim 7 wherein the chamber is bounded by an additional actuating wall connected to the upper legs of the H shape, the additional actuating wall at least in partial regions being flexible but tension-proof and pressure-resistant.

12. The clamping and/or braking device of claim 7 wherein the actuating wall is connected to the basic body by an articulated joint region.

13. A clamping and/or braking device including:
   (a) a basic body having an inner region forming a closed ring and an outer region, the inner region and the outer region being connected together by a connecting region, the inner region having a clamping and/or braking region provided on an inner surface thereof, the clamping and/or braking region for pressurizing an element extending through the ring formed by the inner region; and
   (b) an actuating mechanism included in the connecting region between the inner region and outer region of the basic body, the actuating mechanism including two actuating walls that extend between the inner region and outer region of the basic body to form a chamber, the two actuating walls being essentially straight when the chamber is not pressurized by means of overpressure or by means of a vacuum, at least one of the actuating walls being at least in partial regions flexible but tension-proof and pressure-resistant, the actuating mechanism for exerting forces on the inner region of the basic body to substantially elastically deform the inner region of the basic body in response to an overpressure or vacuum applied within the chamber, the deformation moving the clamping and/or braking region on the inner region out of a pressurizing position or reducing the pressurizing force which the clamping and/or braking region exerts on the element extending through the ring formed by inner region.

14. The clamping and/or braking device of claim 13 wherein the actuating mechanism includes several chambers arranged in a spoke-like fashion around the inner region.

15. The clamping and/or braking device of claim 13 wherein the entire connecting region is formed by the two actuating walls which extend essentially parallel to one another when the chamber is not pressurized by means of overpressure or by means of a vacuum.

16. The clamping and/or braking device of claim 13 wherein the actuating wall is connected to the basic body by an articulated joint region.

* * * * *

UNITED STATES PATENT AND TRADEMARK OFFICE
CERTIFICATE OF CORRECTION

PATENT NO. : 6,629,584 B1  Page 1 of 1
DATED : October 7, 2003
INVENTOR(S) : Willy Mueller It is certified that error appears in the above-identified patent and that said Letters Patent is hereby corrected as shown below:

Column 2,
Line 44, after "wall" insert -- or actuating wall. --

Signed and Sealed this

Thirteenth Day of January, 2004

JON W. DUDAS
*Acting Director of the United States Patent and Trademark Office*